United States Patent
Notani et al.

(10) Patent No.: US 11,501,736 B2
(45) Date of Patent: Nov. 15, 2022

(54) SYSTEMS AND METHODS FOR CONTEXT-BASED OPTICAL CHARACTER RECOGNITION

(71) Applicant: MicroStrategy Incorporated, Tysons Corner, VA (US)

(72) Inventors: Shweta Notani, Seattle, WA (US); Liang Chen, Fairfax, VA (US); Jinliang Zeng, Vienna, VA (US); Yan Li, Fairfax, VA (US); Ting Dong, Annandale, VA (US); Jose Manuel Nocedal De La Garza, Leesburg, VA (US); Nida Imtiaz, Vienna, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 65 days.

(21) Appl. No.: 17/065,837

(22) Filed: Oct. 8, 2020

(65) Prior Publication Data
US 2021/0142763 A1 May 13, 2021

Related U.S. Application Data

(60) Provisional application No. 62/932,026, filed on Nov. 7, 2019.

(51) Int. Cl.
| | |
|---|---|
| *G06K 9/62* | (2022.01) |
| *G09G 5/08* | (2006.01) |
| *G09G 5/02* | (2006.01) |
| *G06V 30/10* | (2022.01) |

(52) U.S. Cl.
CPC ............ *G09G 5/08* (2013.01); *G06K 9/6215* (2013.01); *G09G 5/02* (2013.01); *G06V 30/10* (2022.01); *G09G 2320/0686* (2013.01)

(58) Field of Classification Search
CPC .... G09G 5/08; G09G 5/02; G09G 2320/0686; G06K 9/6215; G06V 30/10; G06T 2200/24; G06F 3/047; G06F 3/048; G06F 16/36; G06F 40/20; G06F 40/205; G06F 40/279
See application file for complete search history.

(56) References Cited

U.S. PATENT DOCUMENTS

| | | | |
|---|---|---|---|
| 10,318,995 B2 * | 6/2019 | King | G06Q 30/02 |
| 2008/0086700 A1* | 4/2008 | Rodriguez | H04M 1/72436 715/804 |
| 2014/0218385 A1* | 8/2014 | Carmi | G06T 7/136 345/620 |

* cited by examiner

*Primary Examiner* — Antonio A Caschera
(74) *Attorney, Agent, or Firm* — Bookoff McAndrews, PLLC

(57) ABSTRACT

Methods, systems, and apparatus, including computer programs stored on computer-readable media, for displaying contextually relevant information, comprising receiving cursor data comprising a location of a cursor on an electronic display, and determining a screenshot of at least a portion of the electronic display. One or more proximate alphanumeric characters may be determined in at least a portion of the screenshot based on the location of the cursor, and at least one of the proximate alphanumeric characters may be matched with one or more terms from a predetermined list of terms. An information card may be caused to be displayed on the electronic display based on the location of the cursor, the information card corresponding to the one or more terms from the predetermined list of terms.

20 Claims, 7 Drawing Sheets

SYSTEMS AND METHODS FOR CONTEXT-BASED OPTICAL CHARACTER RECOGNITION

CROSS-REFERENCE TO RELATED APPLICATION

This application claims the benefit of U.S. Provisional Patent Application No. 62/932,026, filed on Nov. 7, 2019, the entire contents of which are incorporated herein by reference.

TECHNICAL FIELD

The present disclosure relates to systems and methods for context-based optical character recognition.

INTRODUCTION

Software applications and websites are capable of accelerating contextually relevant information acquisition as compared with prior paper-based catalogues. However, problems arise in processing copious amounts of data and in presenting contextually relevant information expediently.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one general aspect, a method performed by one or more computers includes: receiving cursor data comprising a location of a cursor on an electronic display, and determining a screenshot of at least a portion of the electronic display. One or more proximate alphanumeric characters may be determined in at least a portion of the screenshot based on the location of the cursor, and at least one of the proximate alphanumeric characters may be matched with one or more terms from a predetermined list of terms. An information card may be caused to be displayed on the electronic display based on the location of the cursor, the information card corresponding to the one or more terms from the predetermined list of terms.

In one general aspect, a system for accelerating contextual delivery of data may comprise one or more processors and one or more machine-readable media storing software including instructions that, when executed by the one or more processors, cause the system to perform operations comprising: receiving cursor data comprising a location of a cursor on an electronic display, and determining a screenshot of at least a portion of the electronic display. One or more proximate alphanumeric characters may be determined in at least a portion of the screenshot based on the location of the cursor, and at least one of the proximate alphanumeric characters may be matched with one or more terms from a predetermined list of terms. An information card may be caused to be displayed on the electronic display based on the location of the cursor, the information card corresponding to the one or more terms from the predetermined list of terms.

In one general aspect, a non-transitory machine-readable media may store instructions that, when executed by one or more processors, cause the performance of operations for accelerating contextual delivery of data comprising: receiving cursor data comprising a location of a cursor on an electronic display, and determining a screenshot of at least a portion of the electronic display. One or more proximate alphanumeric characters may be determined in at least a portion of the screenshot based on the location of the cursor, and at least one of the proximate alphanumeric characters may be matched with one or more terms from a predetermined list of terms. An information card may be caused to be displayed on the electronic display based on the location of the cursor, the information card corresponding to the one or more terms from the predetermined list of terms.

Other embodiments of these and other aspects include systems, devices, and computer-readable media configured to cause the actions of the methods to be performed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Like reference numbers and designations in the various drawings indicate like elements.

DETAILED DESCRIPTION

Figure 1:
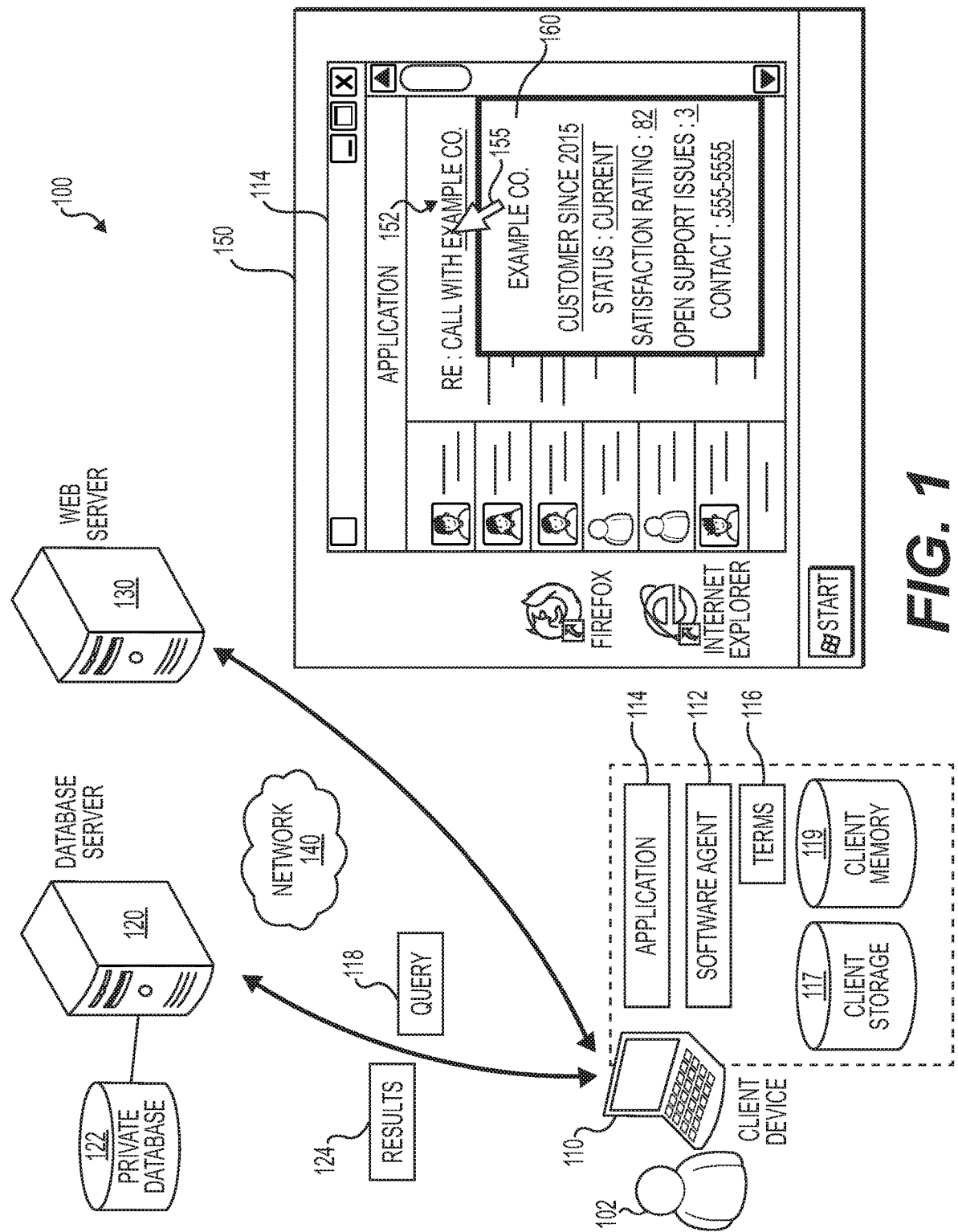
FIG. 1 is a diagram of an example of a system for inline delivery of database content.

In the discussion that follows, relative terms such as "about," "substantially," "approximately," etc. are used to indicate a possible variation of ±10% in a stated numeric value. It should be noted that the description set forth herein is merely illustrative in nature and is not intended to limit the embodiments of the subject matter, or the application and uses of such embodiments. Any implementation described herein as exemplary is not to be construed as preferred or advantageous over other implementations. Rather, as alluded to above, the term "exemplary" is used in the sense of example or "illustrative," rather than "ideal." The terms "comprise," "include," "have," "with," and any variations thereof are used synonymously to denote or describe a non-exclusive inclusion. As such, a process, method, article, or apparatus that uses such terms does not include only those steps, structure or elements but may include other steps, structures or elements not expressly listed or inherent to such process, method, article, or apparatus. Further, the terms "first," "second," and the like, herein do not denote any order, quantity, or importance, but rather are used to distinguish one element from another. Similarly, terms of relative orientation, such as "front side, "top side," "back side," "bottom side," etc. are referenced relative to the described figures. Moreover, the terms "a" and "an" herein do not denote a limitation of quantity, but rather denote the presence of at least one of the referenced item.

In some implementations, a computing system may identify keywords in a user interface, or otherwise on a display, and dynamically retrieve and present relevant information inline, or otherwise in a proximate location, with the user interface. As will be discussed further herein, keywords may be identified upon applying optical character recognition on an image capture of at least a portion of a display. For example, a client device may run a software agent, such as a web browser extension or desktop application, that monitors a display for instances of certain keywords.

When the keywords are present, the software agent may annotate the keywords and make them interactive in the user interface. If a user interacts with a keyword, for example, by placing a cursor over the keyword, the software agent may cause an information card or information panel to be displayed, e.g., overlaying a portion of the original user interface or otherwise inserted into the user interface. Information cards may be displayed in response to a user search, and may be used in conjunction with a calendar, email, or other application, where notifications to the user may be generated if keywords match contents of information cards. In this manner, the user may easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system may allow for significant customizability. The keywords monitored by the software agent may be specific to a user or one or more user organizations. For example, when the user is an employee of a company, the keywords of interest may be extracted from a private database associated with the company. The keywords may additionally or alternatively be selected or filtered to terms applicable to the specific user, e.g., terms relevant to the user's role in the company. When one of the keywords is determined to be present in the user interface, the software agent may communicate with a server system to obtain information related to the keyword. This information may include data retrieved from a private database that has information specific to an organization associated with the user. For example, if the keyword refers to a customer of a user's company, status information, statistics, contact information, and other information about the customer's account with the company can be provided from the company's private database.

The types of information provided, as well as the values shown for those information types, may be customized for the user and/or organization. For example, a sales representative and a product engineer at the same company may be shown different types of information for the same keyword, due to their different roles. Similarly, two users in a company with the same role might be shown different information for the same keyword, due to the users having different types of previous interactions with the system. Similarly, two users in a company with the same role and same previous interactions with the system might be shown different information for the same keyword, due to the users having different individual preferences and/or settings (e.g., based on a user profile). In general, the system may use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface.

The challenge of embedding content in user interfaces is also significant since the embedded content may be needed only selectively. For example, it may be desirable to embed content on some interfaces but not others. Similarly, the embedded content might only be applicable for a page at certain times and not others. The need for the embedded content may vary over time, and may depend on factors such as the context provided by other content in the page, which may also vary over time. As a result of these factors and others, simply adjusting a general template for many pages cannot perform the fine-grained integration of embedded content, since the decision of whether to embed content and what content to embed is often a page-specific decision that changes over time.

A further challenge arises since embedded content may be assembled from a plurality of data sources, including third party data sources, which may make the process slow and degrade the user experience.

The techniques discussed herein address these challenges by allowing content to be presented inline or otherwise associated with applications that the content provider does not control and cannot modify. Similarly, the system can be configured to provide content inline or otherwise associated with other content that has not been created yet, such as web pages, web applications, and/or user interfaces of native "heavy" applications that are not yet available.

The techniques in this document also provide an efficient way for users to access information, such as analytics data, in a user interface. By allowing a user to call up an information card within an existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface, or overlapping/adjacent thereto, where the user needs the information. This provides needed information to just the right user, at the right time, at the user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, hover, click, gaze, gesture, swipe, press, or tap on a term in the user interface. While the term "cursor" may be used herein, this term may also indicate points of user focus on the screen even though no visible cursor is present. For example, a user placing a finger on a touchscreen may indicate a point of user focus that may be called a cursor, even though a visible cursor might not be present.

Limited user interface space might be used since the information card may be provided in the same window or area of the application that the user is already using, with no need to switch between applications. Also, the information card may be displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on, reflected in its private database. Based on the database contents, terms/keywords may have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator may identify columns of a private database corresponding to employee names, customer names, and product names. The system may extract the contents of these columns and designate them as key terms for the organization. The current set of these terms can be downloaded to client devices of members of the organization when they authenticate to the software agents on the client devices, so each time the user authenticates, the set of terms is refreshed at the client device based on the current state of the database. The terms may be organized into related categories. Each category may be known as an information card set. For example, terms corresponding to company names may be categorized under a company information card set. Terms corresponding to employee names may be categorized under an employee information card set. The information displayed in the information cards may also be generated using the current records of the database. Thus, by designating certain records or fields from an organization's database, an administrator can adjust or update the set of content published to some or all members of the organization, which will be made available through many user interfaces (e.g., presented in-line or adjacent to any web page or desktop application interface).

When a client device indicates that one of the key terms for the organization is present, the server system can access the underlying database record(s) corresponding to the term to generate relevant information to provide. The semantic meaning of the term that is applicable for the user and organization may be used to provide customized results. For example, different types of information may be provided based on the classification of the term, e.g., whether a term is the name of an employee, customer, or product. Different semantic classifications can have different data types or sets of information to be provided. Even for a particular classification, of the many potential types of data that may be provided, a subset may be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organization's security policies are preserved. If a user does not have authorization to access a field or record from the database, the server system may enforce access restrictions and might not provide the information. Consequently, different users, even within the same organization, may be presented different sets of information for the same term, due to the users' differing roles, interaction histories, access authorizations, preferences, and other factors. The data to be presented may also be customized based on the application in which the term is detected on an application-by-application basis.

FIG. 1 is a diagram of an example of a system 100 for inline or otherwise proximate delivery of database content. The system 100 may include one or more client devices 110, one or more servers 120, and/or one or more web servers 130. The client device 110, server 120, and web server 130 may communicate across one or more networks 140. The server 120 may have access to one or more private databases 122 for an organization. The server 120 may be implemented using multiple computers that cooperate to perform the functions discussed below, and which may be located remotely from each other. The client device 110 may include an application 114 as well as a software agent 112 that enables the client device 110 to dynamically generate and display contextually-relevant information cards 160 inline with, or adjacent to, the application 114 on an electronic display 150 of the client device 110. As discussed below, the software agent 112 may allow the client device 110 to obtain and provide information from the private database 122 with the application 114 and web page from the web server 130, even though the application 114, which may access a web page, may be controlled by third parties.

The client device 110 may be associated with a user 102, who may be a member of an organization, e.g., an employee of a company. The private database 122 represents database records stored by or for the organization. The records might not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access. Techniques used herein may also accumulate data from publicly available databases for displaying information cards 160.

Some techniques may incorporate analytics content into the body of a document for display in application 114, using an iFrame or similar technique. This approach can be inefficient, because each application or web page generally needs to be updated individually. Further, this type of embedding may not be possible when the content provider does not control the target application or web page for content to be embedded into. For example, an organization may not be able to change the standard e-mail application interface that a third party provides.

In the system 100, instead of incorporating additional content into the source of a document or application, information may be instead added, just in time, through the software agent 112, for example, a browser extension for a web browser, a subroutine of application 114, etc. This provides the flexibility for the system to selectively provide dynamically changing content from the private database 122 for any interface shown on the application 114, e.g., any web application or web page displayed by a web browser, any user interface displayed on the electronic display 150 of the client device 110, etc.

In the example of FIG. 1, the client device 110 may communicate with the web server 130 to obtain and display a page of a web site or other user interface of the application 114. Alternatively, application 114 may comprise a native desktop application, and may require no communication or minimal communication with web server 130. The client device 110 generates an electronic display 150 for the application 114. The client device 110 may generate displays in the electronic display 150 for more than one application. Concurrently, the software agent 112 runs on the client device 110 and may receive, from the application 114, the text content of the rendered page, e.g., electronic display 150. As will be discussed further below, the text content may be obtained by performing optical character recognition (OCR) of the electronic display 150, or a portion thereof (e.g., a subportion), such as within a predetermined distance of cursor 155. The electronic display 150 may comprise a desktop displaying one or more applications, including application 114.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been, or will be, granted to the user 102 by the organization.

With the user authenticated (e.g., logged in), the software agent 112 may access a set of terms 116, e.g., key words and/or phrases, that are relevant to the user 102 and the organization. The set of terms 116 may be stored at the client device 110. Terms 116 may be stored in client storage 117, which may comprise non-volatile storage, and/or client memory 119, which may comprise volatile storage, where the client memory 119 may provide faster data access speeds than the client storage 117. In some implementations, the set of terms 116 is requested and received from the server 120 each time the user 102 authenticates. The set of terms 116 can represent values from certain fields of the private database 122, for example, values representing names of customers of the company of the user 102.

The software agent 112 may compare the terms 116 with at least a portion (e.g., subportion) of the text of the electronic display 150 to identify matching terms. When the software agent 112 identifies one or more matches, it may generate a query 118 that indicates the matches and sends the query 118 to the server 120. In some implementations, the software agent 112 may also examine the text of the electronic display 150 to identify and include in the query 118 other contextual factors that may be of interest (which may be different from the terms 116 of interest), such as terms indicating a time or a geographical location indicated in the electronic display 150, or a task of the user 102 that may be indicated in the electronic display 150. Various words and phrases indicating an overall subject or topic of the electronic display 150 may also be extracted and provided in the query 118. In some implementations, metadata, tags, and/or comments associated with images, graphics, and videos shown on the electronic display 150 may also be examined to identify and include in the query 118 other contextual factures that may be of interest.

The server 120 may process the query 118 and generate results 124 using the contents of the private database 122. These results 124 may indicate, for each identified matching term, various indicators (e.g., attributes, statistics, visualizations, text, or other content) relevant to the term. In some instances, the indicators may represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 may receive the results 124 from the server 120. The software agent 112 may annotate instances of the identified matching terms in the user interface and prepare the results 124 for display. For example, to annotate the matching terms, the software agent 112 may instruct the application 114 to highlight the term or otherwise change the formatting of the term (e.g., color, font, size, bold, italics, underlining, etc.) in the electronic display 150. In some implementations, the results 124 are not immediately displayed. Rather, the software agent 112 may cause the matching terms to become interactive, so that interaction of the user with a term triggers display of an information card 160 for that term. In this manner, when a user indicates interest in one of the terms, e.g., by placing a mouse cursor 155 over the term, the software agent 112 may be notified of the interaction and cause an information card with the indicators relevant to the term to be displayed. The information card 160 may be displayed overlaying, or adjacent to, a portion of the original user interface, for example, as a pop-up card near the instance of the term that the user interacted with. The software agent 112 may also detect when the user 102 is no longer interested in the information card and automatically remove (e.g., close or hide) the information card in response. For example, when the user moves the cursor 155 away from the interactive term and away from the information card (or taps or clicks outside the interactive term and information card), the software agent 112 may hide or remove the information card.

In FIG. 1, the software agent 112 has determined that the electronic display 150 includes a term 152 "Example Co.," which is one of the terms 116 relevant to the organization of the user 102. The software agent 112 has received results 124 that indicate indicators for this term 152, which may represent a customer of the organization of the user 102. In response to identifying the matching term 152, and in some instances also receiving results 124 from the server 120 for the matching term 152, the software agent 112 may make the term 152 interactive and causes the term 152 to be annotated. The annotation may comprise, as in this case, underlining, or may be bolding, italicizing, etc. Initially, the software agent 112 might not cause any of the indicators for the term 152 to be displayed. However, when the user moves the cursor 155 over, or otherwise selects, the term 152, the software agent 112 may detect the interaction and display an information card 160 showing various indicators provided by the server 120 in the results 124. When the user 102 is done reviewing the information card 160, the user 102 may move the cursor 155 away or click away from the term 152 and information card 160, and the software agent 112 may automatically hide or remove the information card 160 until the user 102 again interacts with the term 152.

According to some implementations, the software agent 112 may annotate instances of the identified matching terms in the user interface and prepare the results 124 for auditory or haptic provision. For example, to annotate the matching terms, the software agent 112 may instruct the application 114 to highlight the term or otherwise change the formatting of the term (e.g., color, font, size, bold, italics, underlining, etc.) in the electronic display 150. In some implementations, the results 124 are not immediately displayed. Rather, the software agent 112 may cause the matching terms to become interactive, so that interaction of the user with a term triggers a sound clip to be played. The sound clip may provide the same information as the information card 160 and may be auto generated (e.g., a text-to-sound conversion). In this manner, when a user indicates interest in one of the terms, e.g., by placing a mouse cursor 155 over the term, the software agent 112 may be notified of the interaction and cause a sound clip to be generated and/or played from one or more speakers (not shown) associated with the client device 110. The software agent 112 may also detect when the user 102 is no longer interested in the sound clip and automatically the sound clip from being played, in response. For example, when the user moves the cursor 155 away from the interactive term and away from the information card (or taps or clicks outside the interactive term and information card), the software agent 112 may stop or pause the sound clip.

The software agent 112 may receive and examine the content of the electronic display 150 on a recurring or ongoing basis. For example, as the user 102 navigates to a new web page or a new view of an application, the software agent 112 examines the updated content of the electronic display 150. The software agent 112 may determine matches in the updated interface, and request/obtain new results for the updated interface, and may cause new sets of terms to be annotated and made interactive, allowing the user 102 to access information cards for key terms for whatever interface content may be provided in the application 114. The software agent 112 may receive and analyze user interface content in substantially real time. For example, if the user 102 composes an e-mail message, the software agent may detect matching terms in text that the user types, in some instances while the user is still typing, and annotate matching terms in this content.

The system may provide very low latency for users to receive information regarding key terms in a user interface. Because the software agent 112 may identify terms and obtain terms automatically and in the background, in many instances the information needed for an information card 160 may be already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface of the application 114.

Figure 2A:
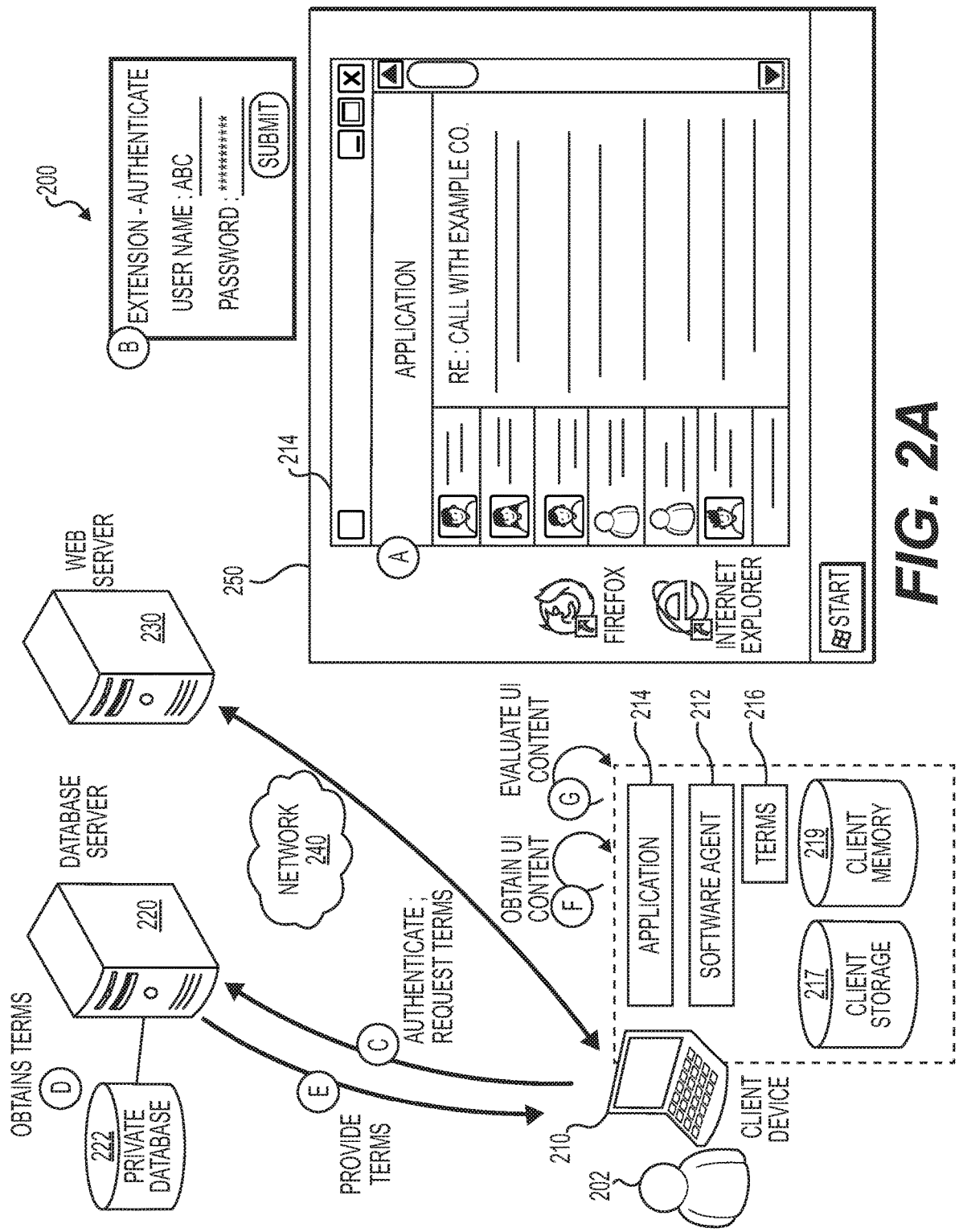
FIGS. 2A-2B are diagrams illustrating another example of a system for inline delivery of database content.
Figure 2B:
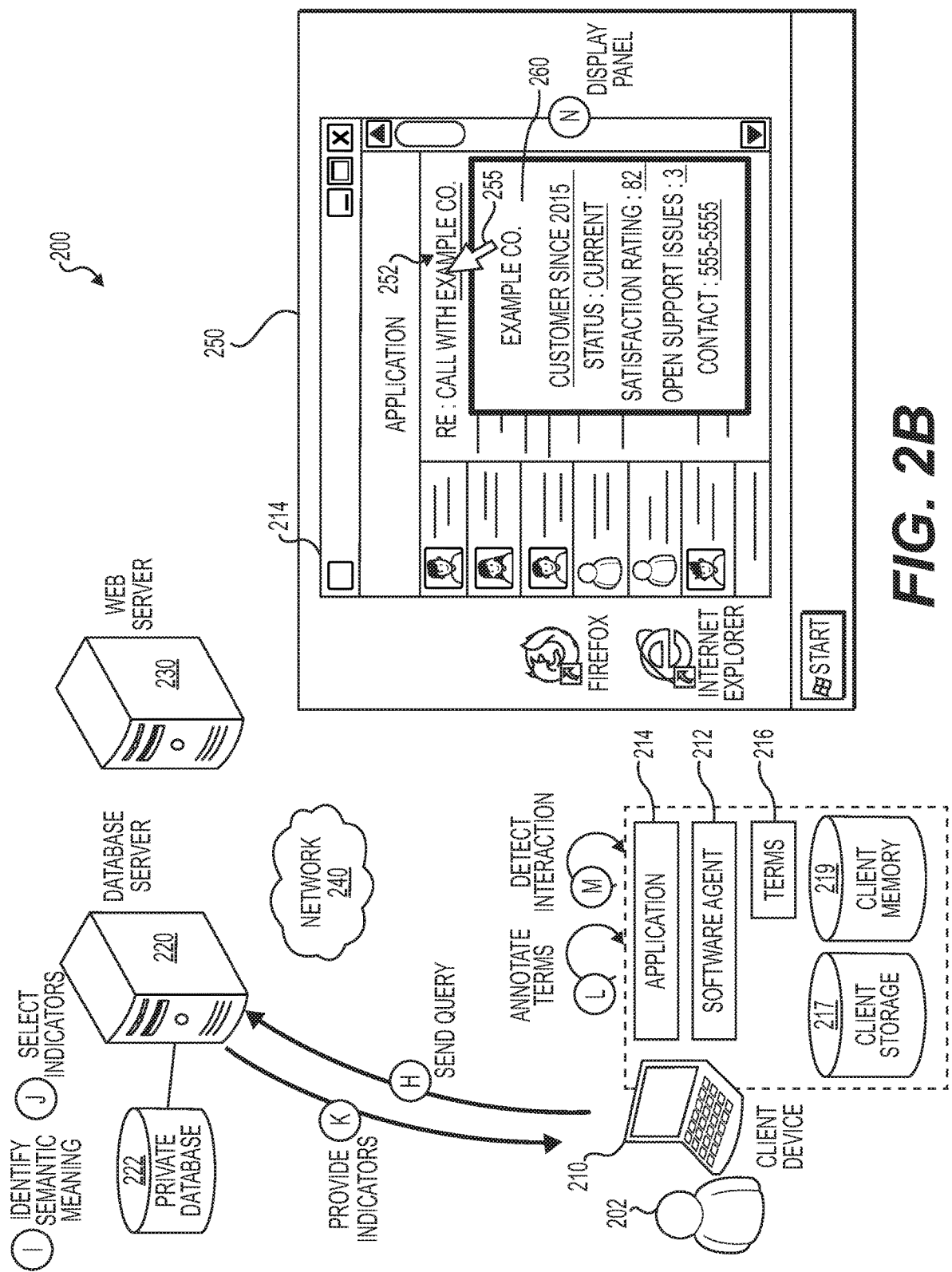

FIGS. 2A-2B are diagrams illustrating another example of a system 200 for inline or proximate delivery of database content. FIGS. 2A-2B illustrate various operations of the system 100 in greater detail. FIGS. 2A-2B illustrate operations and flows of data represented as stages (A)-(N), which can be performed in the order shown or in a different order.

The system 200 may include one or more client devices 210, one or more servers 220, and/or one or more web servers 230. These devices and servers may communicate across one or more networks 240. The server 220 may have access to a private database 222 for an organization. The server 220 may be implemented using multiple computers that cooperate to perform the functions discussed below, and which may be located remotely from each other. The client device 210 may include an application 214 as well as a software agent 212 that enables the client device 210 to dynamically generate and display contextually-relevant information cards inline with, overlapping, or proximate to, the application 214. As discussed below, the software agent 212 may allow the client device 210 to obtain and provide information from the private database 222 with the application 214 and web page or other application interface (which may partially or completely be obtained from the web server 230), even though the application 214 and web page/application interface 214 may be controlled by third parties.

In stage (A), the client device 210 may obtain and display content from the web server 230 in the electronic display 250.

In stage (B), the user 202 may be authenticated via the software agent 212, e.g., a web browser extension, add-on for another type of application 114, or stand-alone application. For example, the software agent 212 may prompt the user 202 to log in, or the user may click an icon for the software agent 212 to initiate log in. The user can enter a username and password, or alternatively authenticate in another form, e.g., through biometric data entry, entry of a PIN code, etc. While an extension is shown in stage (B), techniques disclosed herein may operate on a desktop, and may not require usage of an extension.

In stage (C), the software agent 212 may communicate with the server 220 to authenticate the user 202. The software agent 212 may optionally request updated information from the server 220, such as a set of terms 216 representing keywords relevant to the user 202 and/or an organization of the user 202.

In stage (D), the server 220 may complete the authentication of the user 202. Once it is determined that the received credentials are valid and are authorized access to information from the private database 222, the server 220 may obtain the current set of terms or keywords that are applicable for the user 202 and the user's organization. This may involve extracting information from the private database 222, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers may also be included. The terms may be filtered based on the access permissions of the user 202, the role of the user 202 (e.g., department, job title, responsibilities, etc.), and/or other factors.

In stage (E), the server 220 may provide the terms 216 to the client device 210 for storage and/or use by the software agent 212. Terms 216 may be stored in client storage 217, which may comprise non-volatile storage, and/or client memory 219, which may comprise volatile storage, where the client memory 219 may provide faster data access speeds than the client storage 217. The terms can be set by an administrator for the system 200. In some implementations, the set of terms is generated by the server, for example, by pulling terms from portions of a database or other data sources. For example, the server 220 may access database tables that list entity names (e.g., for competitors, suppliers, partner organization, employees, customer contacts, etc.) as well as abbreviations and/or nicknames for them. Based on the identity and role of the user 202, the server 220 may filter the list, e.g., limiting the extracted set of terms to those having information determined to be relevant to the role of the user 202 and/or those for which the user 202 has security permissions to access corresponding data. The set of terms may be further limited to terms for types of entities for which appropriate information card templates have been defined. The filtered list of terms can then be provided to the client device 210. The database may be queried dynamically each time, or periodically, to obtain an up-to-date set of key terms each time a new set of terms 216 is requested.

In some implementations, the user 202 may be able to customize the set of terms, or categories of term types, that are annotated and made interactive to be able to trigger display of an information card. For example, the software agent 212 may provide a user interface allowing a user 202 to edit the list of terms, e.g., to add or remove terms from the set that will be identified and annotated in the future. These changes can be customized for the specific user identity of the user 202 who is logged in and/or for the specific client device 210 used. The user interface may allow edits for individual terms, or for groups or categories of terms. This ability can allow a user to limit the terms that will be annotated to the set that the user is specifically interested in. Similarly, it can expand the set of terms to include terms that might not be directly related to the user's role but still relate to the user's interests. Although individual terms or groups or categories of terms may be edited (e.g., by a user), it will be understood that the content of the information card 260 provided at stage (J), based on one or more of the edited terms, may still be restricted based on access permissions associated with the user 202.

The terms 216 can be terms other than proper names. For example, for an engineer, the terms 216 may additionally or alternatively include component types, product names, or technical terms. Corresponding information cards may indicate a variety of types of information. For a component, a card might provide specifications, indicate suppliers, provide links to datasheets, identify products that use the component, etc.

In stage (F), the software agent 212 may obtain user interface content from the application 214. For example, the software application 212 obtains text content from the electronic display 250. This can include the entire content of the rendered page, document, or view, not only the portion that may be currently visible on screen (e.g., due to the current scrolling position).

In stage (G), the software agent 212 may evaluate content of the user interface. For example, this may include comparing text from the electronic display 250 with the terms 216 provided by the server 220 and stored at the client device 210, to identify matching terms that should be annotated and for which information cards may be generated. As will be discussed further below, optical character recognition (OCR) may be performed on the electronic display 250 and/or the interface of the application 214 in order to obtain the text for comparison to the terms 216.

In some implementations, the software agent 212 and/or the database server 220 may analyze text of the electronic display 250 to identify or generate indicators to be displayed. Through analysis of the text of the UI, the software agent 212 and/or the database server 220 can, in real-time, produce indicators and other information on the fly, without the indicators being previously designed by a human author or administrator. For example, if the software agent 212 detects there are multiple instances of an attribute combined with time and geographical dimensions, through interactions with the server 220, the software agent 212 can produce specific aggregations of data for the indicated time and geography and present the information in an information card. To carry out this function, the server 220 may access a semantic graph to enable interpretation of content as it relates to a business or other entity, provide a summary, and link to more details, all of which can be produced dynamically. The semantic graph can indicate, for example, the attributes of an entity and may indicate where to locate data for the attributes from the private database 222.

As an example, from text in a web page or native or desktop application 214, the software agent 212 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning that may be identified by the software agent 212. From these additional terms, the software agent may compose one or more indicators to be requested from the database server 220. For example, the software agent 212 may generate a query that requests a number of subscribers from Example Co. that were added in Florida from April to June of 2016. Similarly, the software agent 212 may generate a query requesting a total number of subscribers from the company for the same period and location. In addition, or as an alternative, the software agent 212 may provide the terms with semantic meanings to the database server 220, and the database server 220 can identify appropriate indicators from the terms.

Referring to FIG. 2B, in stage (H), the software agent 212 may generate a query that indicates which terms 216 were identified in the electronic display 250. The query can additionally include other contextual information, such as indications of time, geographical location, or topic that the software agent 212 identified in the content from the electronic display 250. The software agent 212 may cause the client device 210 to send the query to the server 220.

In stage (I), the server 220 may identify a semantic meaning for each identified term that the query indicates. As part of identifying a semantic meaning, the server 220 may select a semantic classification from among multiple predetermined semantic categories. The semantic meaning may be generated using the information of the private database 222 and so can be specific to the user 202 and the organization of the user. For example, one company may be a supplier for one organization and a customer of another. Similarly, even within one organization, an individual may be the supervisor of one user but a peer of, or may be supervised by, a different user. Thus, the interpretation of the terms may vary based on the relationships indicated in the private database 222 and can vary from one organization to another, from one user to another, and over the course of time.

In stage (J), the server 220 may select indicators for each identified match to the terms 216. The server 220 may also look up or calculate values for each type of indicator selected. These indicators or types of values to show may be any of multiple types of values. For example, some indicators may be attributes or database field values retrieved directly from a database or other data source. As another example, indicators may be results of aggregation of data from one or more databases, or may be results of processing data with equations, formulas, functions, or models.

The server 220 may select the indicators to be provided using one or more templates that specify which indicators to use in information cards corresponding to different types of entities. For example, a template specifying a first set of indicators may be used for entities classified as suppliers, while a template specifying a different set of indicators may be used for entities classified as customers. As another example, companies, people, locations, and products may each have different templates or sets of indicators predefined, since each may have different attributes or characteristics of interest. Both of these can also be used together. For example, a first set of the indicators may be determined based on a classification of an entity (e.g., person, place, object, etc.) while a second set of the indicators may be determined based on a different classification for the entity (e.g., supplier, customer, competitor, etc.). The templates may indicate formatting and layout for information cards as well as the types of indicators that should be provided.

As noted above, for each matching term, the server 220 may determine a semantic classification of the term, e.g., a category or classification of the term and/or identifying an entity that the term refers to (e.g., where the entity may be a particular person, company, object, etc.). The server 220 may also access one or more records from the private database 222. The types of records accessed may vary based on the semantic classification. For example, when the term is a customer name, the accessed records may indicate attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 220 may have a number of potential indicators or types of data that can be provided. These indicators may take any appropriate form, such as text, numbers, icons, charts, graphs, images, etc. In some instances, the indicators may represent key performance indicators for an entity referenced by an identified term with respect to the specific organization of the user 202. For each matching term identified in the electronic display 250, the server 220 may select a subset of the available indicators or data types to provide as results. This subset may be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 220 can implement this is to have templates defined for each semantic classification, where the template indicates data types of indicators that are set to be provided for terms having that classification. Each indicator may have one or more references to data within the database 222, e.g., a column or field type of the private database 222 used to obtain or generate the indicator, as well as corresponding equations for generating the indicator and criteria such as a threshold for evaluating the indicator.

In stage (K), the server 220 may provide the values for the selected indicators for each identified term from the query to the client device 210. In the example, the selected indicators include a status of the "Example Co." company with respect to the organization of the user 202, a satisfaction rating indicating how satisfied the company appears to be as a client, a number of open support issues for "Example Co.," and contact information for "Example Co." The server 220 may provide an indication of each of these indicator types, as well as a value corresponding to each indicator, e.g., a value of "current" for the status indicator, a value of "82" for the satisfaction rating indicator, a value of "3" for the number of support issues, and the phone number "555-5555" for the contact information indicator.

In stage (L), the software agent 212 may cooperate with the application 214 to annotate the identified terms in the electronic display 250. For example, the term 252 is annotated in FIG. 2B. This process causes the annotated terms to become interactive. For example, the software agent 212 can register with the application 214 to receive notification of interaction events, such as a mouseover event, click event, tap event, etc.

In some implementations, when the application 214 is a web browser, the software agent 212 can inject code, such as HTML code and/or JavaScript code, into the content of a web page being browsed to cause annotations to be shown. The injected code may also listen for and respond to events, such as a click, mouseover, tap, voice command, swipe, user gesture, or other interaction with annotated terms. When the application 214 is not a web browser, the software agent 212 may use other techniques, such as macros or APIs to cause terms to be annotated and become interactive.

In stage (M), the software agent 212 may detect interaction with one of the annotated terms. For example, the user 202 moves a cursor 255 over the term 252. The software agent 212 may detect the interaction by being notified by code that was injected into a web page, such as event handling code that notifies the software agent 212 of the user action. Other techniques may additionally or alternatively be used. For example, the software agent 212 may monitor user input events generally, with information provided by the operating system, for example. The software agent 212 may track the on-screen position of each annotated term, as well as the position of a cursor or user input, and thus detect when the user has interacted with one of the annotated terms.

In stage (N), the software agent 212, in response to the detected interaction, may cause the display of an information card 260, for example, as an overlay or pop-up over the original electronic display 250. The information card can include the indicators selected by the server 220 and provided over the network 240. In some implementations, the information card 260 can be displayed near, e.g., adjacent to or even partially or completely overlapping the annotated term 252.

While various examples discuss annotating terms shown in a web page, the same techniques can be used to annotate and make interactive terms occurring anywhere in a user interface. Thus, terms in applications, documents, toolbars, controls, or any other part of a user interface can be annotated and made interactive to trigger display of an information card corresponding to the term.

As discussed above, the application can be a web browser, and the software agent can be a web browser extension. Nevertheless, the same techniques can be used to provide information cards for other types of applications and with other types of software agents. For example, a native application for word processing, spreadsheet editing, presentation editing, document viewing, etc. can provide an application programming interface (API) through which the content of the application can be provided to a software agent implemented as an application add-on module or extension. The software agent can integrate with or operate alongside a native application to identify keywords and dynamically display information cards as discussed herein.

Figure 3:
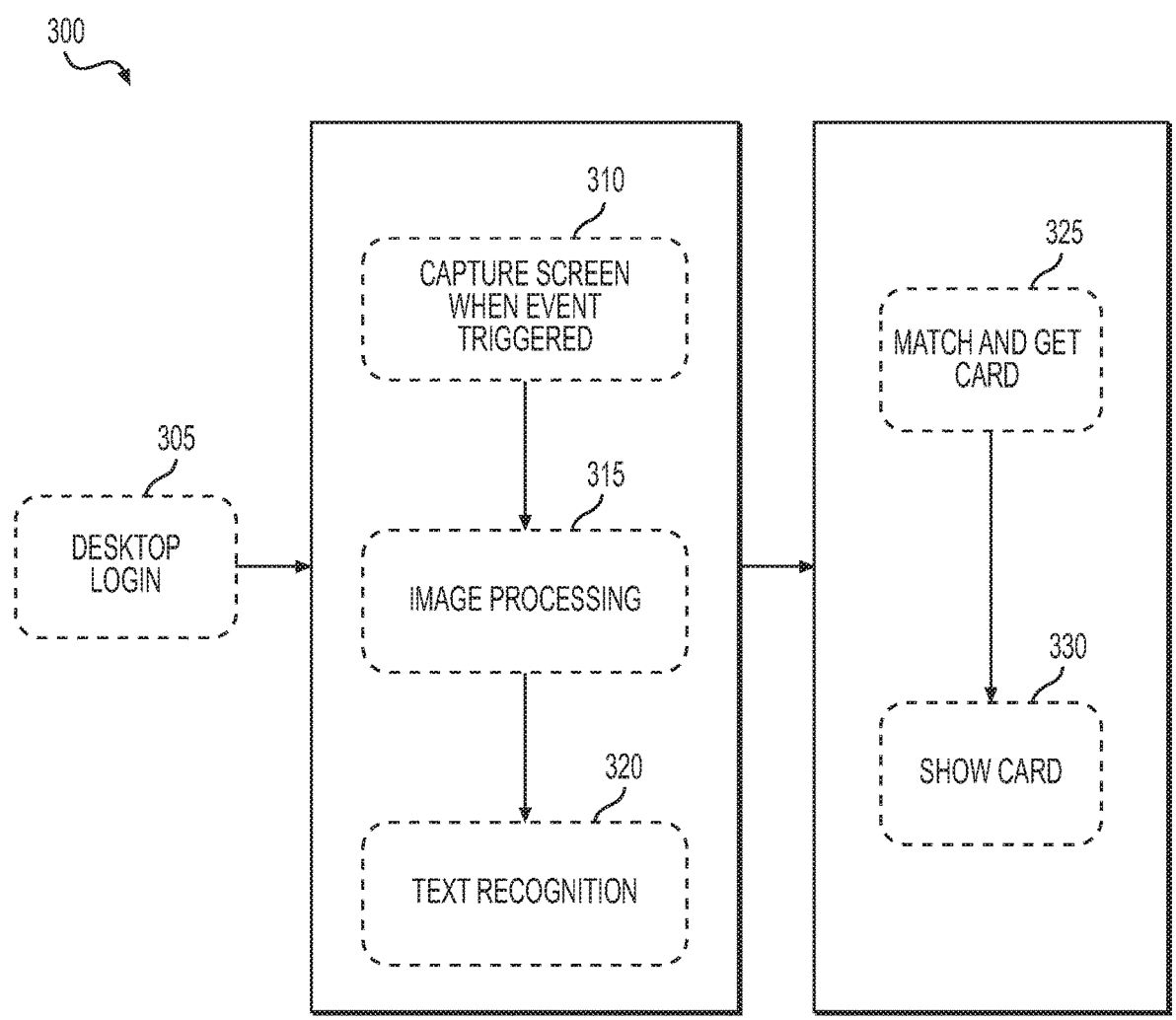
FIG. 3 is a flow chart of an example method of utilizing optical character recognition for the display of textually relevant information cards according to techniques presented herein.

Referring to FIG. 3, a method 300 for performing optical character recognition (OCR) to assist in the identification of words on the electronic display 150 will now be discussed in greater detail. Upon OCR of the electronic display 150, or portion thereof, OCR'd words may be used for matching terms and eventual information card display, as discussed in FIGS. 2A-2B above. OCR abilities may be incorporated into the features of the software agent 112, or may be provided as a service over network 140, for example from server 120. Thus, the software agent 112 may have the ability to receive a user login, scan the electronic display 150 for terms either periodically or upon the detection of events, gather user activity data, provide user searches of terms/keywords, and/or collect analytics data (e.g., indicators shown in stage (K)).

At step 305, a user may login, as discussed above in stage (B). At step 310, a full or partial screenshot may be captured after a predetermined period of time and/or upon the triggering of an event. For example, screenshots may be taken at predetermined time intervals, the screenshots may be OCR'd at step 320, the recognized terms may be matched and associated information cards pre-loaded at step 325. However, information cards might only be displayed, at step 330, if there is a "hover" or other event over text corresponding to one of the terms 116. An event may include a mouseover, hover, click, gaze, gesture, user-initiated text highlight, finger tap, finger press-and-hold, swipe, or a predetermined key combination, etc. The user may also manually select a subportion of the screen for OCR.

One alternative way of getting text to match to the terms 116 is to allow the user to specifically enter the text, either by typing in, copy and paste into a search bar, voice-to-text, etc. However, the OCR may provide a more deliberate and seamless way to get contextual data, as it may require less user effort. Further, if OCR is used, lines of communication do not need to be established with any applications displayed in the electronic interface.

Referring again to step 310, the screenshot may comprise a full screenshot of the electronic display 150, which may result in the full screen being OCR'd. The screenshot may also comprise a partial screenshot, which may have been automatically cropped based on a position of the cursor 155 or determined point of user focus. The size of the partial screenshot may correspond to an area (e.g., subportion) of a predetermined radius around the cursor, or square/rectangle around the cursor of a predetermined size. The size of the partial screenshot may be based on the size, resolution, and/or edges of the electronic display 150. For example, while a default partial screenshot size may be a 150×300 pixel rectangle around the cursor 155, electronic displays 150 above a predetermined size may automatically trigger a larger partial screenshot. Further, a screen resolution above a predetermined amount may automatically trigger a smaller (or larger) partial screenshot, while a screen resolution below a predetermined amount may cause a larger (or smaller) partial screenshot. This may be beneficial because a lower resolution screen may require a larger partial screenshot in order to accurately OCR text.

If the cursor 155 is near the edge of the electronic display 150, the area from which the partial screenshot will be taken may be shifted so as to be fully on the display. Alternatively, the partial screenshot may simply be cropped. For example, if the partial screenshot by default extends 150 pixels to the left of the cursor and 150 pixels to the right, and the cursor 155 is on the left edge of the electronic display, in one embodiment the leftmost pixels will simply be removed, and the partial screenshot will only comprise the 150 pixels to the right of the cursor. Alternatively, the partial screenshot may be moved such that 300 pixels to the right of the cursor are captured. These techniques may be applied upon a user tap or other user focus event, regardless of whether there is a visible cursor 155 on the electronic display 150.

Information cards 160 corresponding to terms on the electronic display 150 may also be pre-loaded. For example, the electronic display 150 may be regularly OCR'd and matching terms 116 (i.e., recognized terms that match the set of terms 116) and/or associated information cards 160 may be identified and preloaded onto client device 110. Although information cards 160 may be preloaded, any particular information card might only be displayed if a qualifying event is detected.

The trajectory of the cursor 155 might also be tracked, and partial screenshots may be taken based upon the trajectory. For example, if a cursor 155 is headed towards the top right of the screen, a partial screenshot of the area immediately to the top right of the cursor may be obtained and OCR'd, and so on. Similarly, the trajectory of a user's gaze and or body part (e.g., finger) might be tracked, and partial screen shots may be taken based upon the trajectory.

The screenshots or partial screenshots may also be taken based on the active window. The active window may comprise the currently focused application interface on the electronic display, which is commonly the application displayed on top of what may be a stack of application windows. The screenshot may be automatically cropped or may otherwise automatically disregard any portion of the screenshot that does not correspond to at least a portion of the active application. Alternatively, an information card 160 might not be displayed, even if an event has been triggered and term identified, if it is determined that the term is from an application that is not the active application.

At step 315, image processing may be performed on the obtained screenshot or partial screenshot, which may enhance the performance of the OCR, which will be discussed further below.

At step 320, OCR may be performed on the screenshot or partial screenshot. The screenshot may be provided to an online text recognition service, such as to an application programming interface (API). The OCR service may be publicly available, such as with Tesseract, or a private custom-trained service.

The OCR results may contain errors or may contain alternative spellings of the terms 116. Natural language processing may be applied to normalize the format of the terms to correct spellings, change tenses, or otherwise match the format of the terms 116. For example, the OCR'd text may read "Johnny Doe," but "John Doe" may be the employee name in the terms 116. The algorithm may detect that Johnny Doe is similar to a name in the terms 116, and may either recommend correction or automatically correct the OCR'd word. The algorithm may also consult a dictionary for determining possible corrections.

After the OCR and text recognition process, it may be determined that the font is above a predetermined size relative to the size of the screenshot, or the font size is beyond a predetermined portion of the partial screenshot. If the font is too big, the OCR process may fail to read enough text so as to be able to match words with terms 116. Accordingly, if the font size is determined to be beyond a threshold relative to the size of the boundaries of the partial screenshot, the size of the boundaries of the partial screenshot may automatically be expanded and/or enlarged. An additional larger screenshot or partial screenshot may be obtained, and the process may be iteratively repeated.

At step 325, as discussed above in relation to FIGS. 1, 2A, and 2B, information cards may be matched to the OCR'd text by identifying terms 116. At step 330, a matched information card 160 may be displayed on the electronic display 150.

Figure 4:
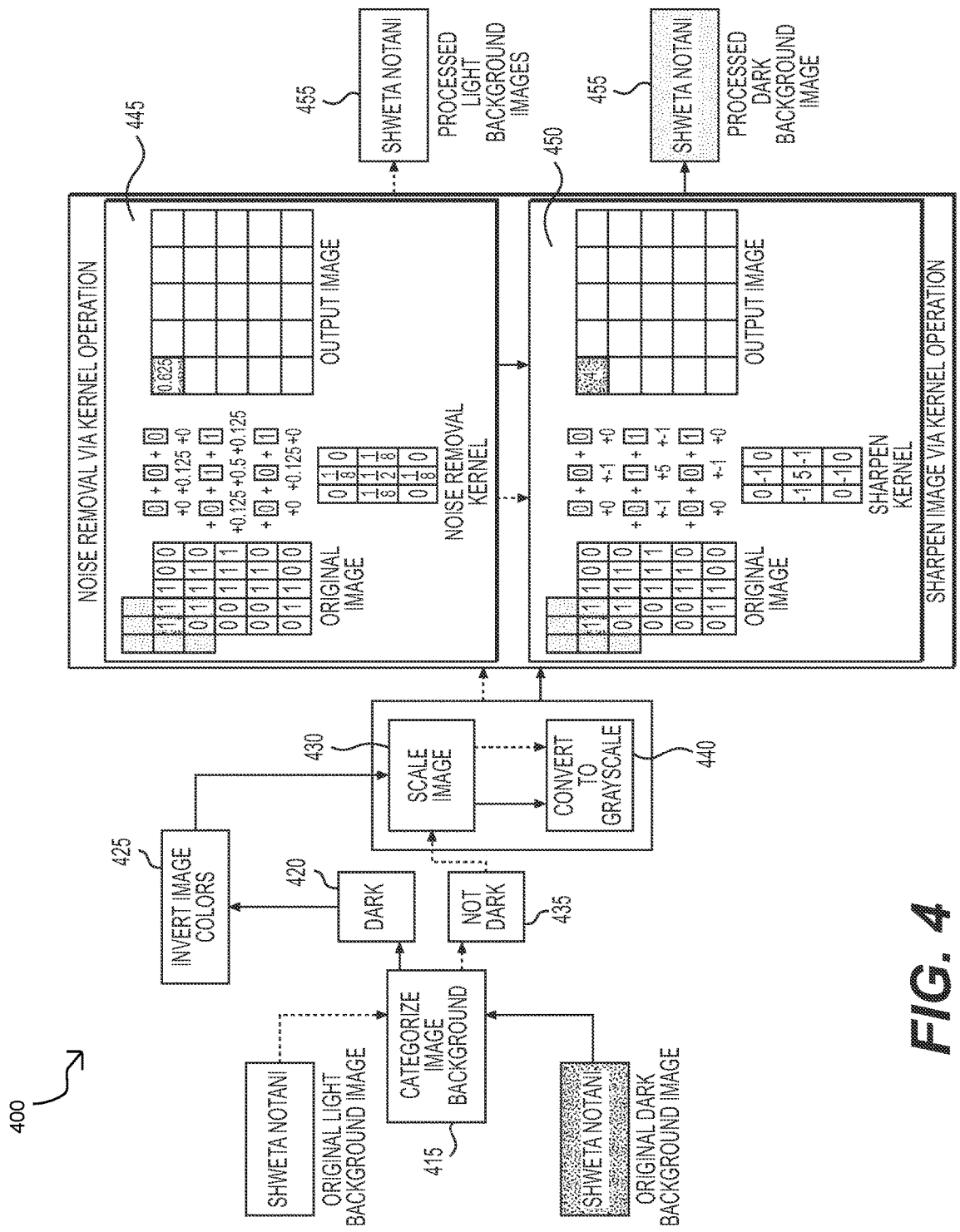
FIG. 4 is a flow chart of an example method of optical character recognition according to techniques presented herein.

Referring to FIG. 4, as discussed above in relation to step 315, method 400 may perform image processing on the screenshot or partial screenshot in order to improve the performance of the OCR process. At step 415, it may be determined whether the screenshot has a light background or a dark background. This may be determined by whether or not the background is above or below a certain pixel value. For example, the RGB channels may be collapsed to a single channel to convert the screenshot to grayscale. The average pixel value of the screenshot may then be determined, as the average value may be assumed to be close to the background color.

At step 420, if the background is determined to be dark, the colors of the screenshot may be inverted at step 425 before being possibly scaled at step 430. At step 435, if the background is not determined to be dark, the screenshot colors might not be inverted before being possibly scaled at step 430.

Scaling may be performed at step 430 because the OCR algorithm may recognize text more accurately if the fonts are at least a minimum size. An initial OCR may determine the font size. If the font size is below a predetermined threshold, the screenshot may be automatically scaled up. Alternatively, all screenshots may be scaled up by a predetermined amount automatically prior to an initial OCR, such as by 1.5 times.

At step 440, if it has not already been done, the screenshot may be converted to grayscale. Different color channels may yield different results in the OCR process. Combining all channels into one may improve the overall accuracy of the OCR.

At step 445, a noise removal via kernel operation may be performed, which may remove differences in neighboring shades of gray in the image. For this the image may be represented in the form of a 2-D matrix. A kernel matrix may then be used that defines the weight of each pixel, and can be a 2-D square matrix of any size, and do a pass across the image to manipulate the target pixel. This may be done by a simple formula that multiplies the current value with the weight for that position and then summing all values.

At step 450, a sharpen image via kernel operation may be performed. The sharpen may help the OCR algorithm focus on the text more than the background. A large weighting may be given to the pixel itself and less weighting to the ones surrounding it. The noise, sharpen, and any other image processing steps may be optional, and may be performed in any order.

At step 455, the processed image may be output and provided to the OCR system.

Figure 5:
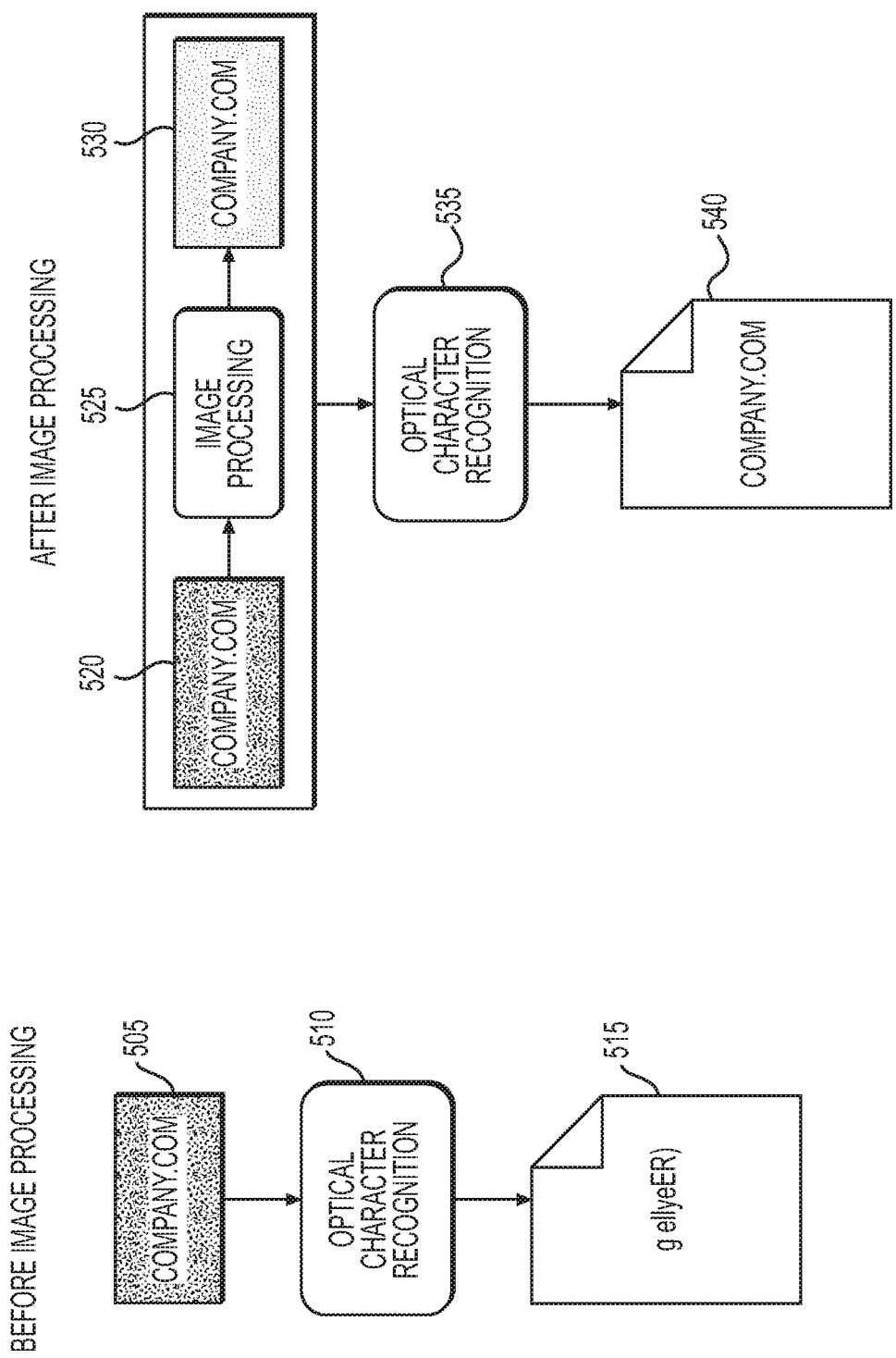
FIG. 5 is a flow chart of example outcomes when using optical character recognition according to techniques presented herein.

Referring to FIG. 5, the as a result of image processing, the OCR accuracy may improve markedly. In a situation without image processing, an image 505 with a dark background may be provided to OCR engine 510. The resulting text (i.e., OCR output 515) may contain errors. Alternatively, image 520 may be provided for image processing 525, which may correspond to one or more of the techniques discussed in relation to FIG. 4, which may produce a processed image 530. The processed image 530 may be provided to the OCR engine 535 to produce OCR output 540, which is likely to have fewer mistakes than OCR output 515.

Figure 6:
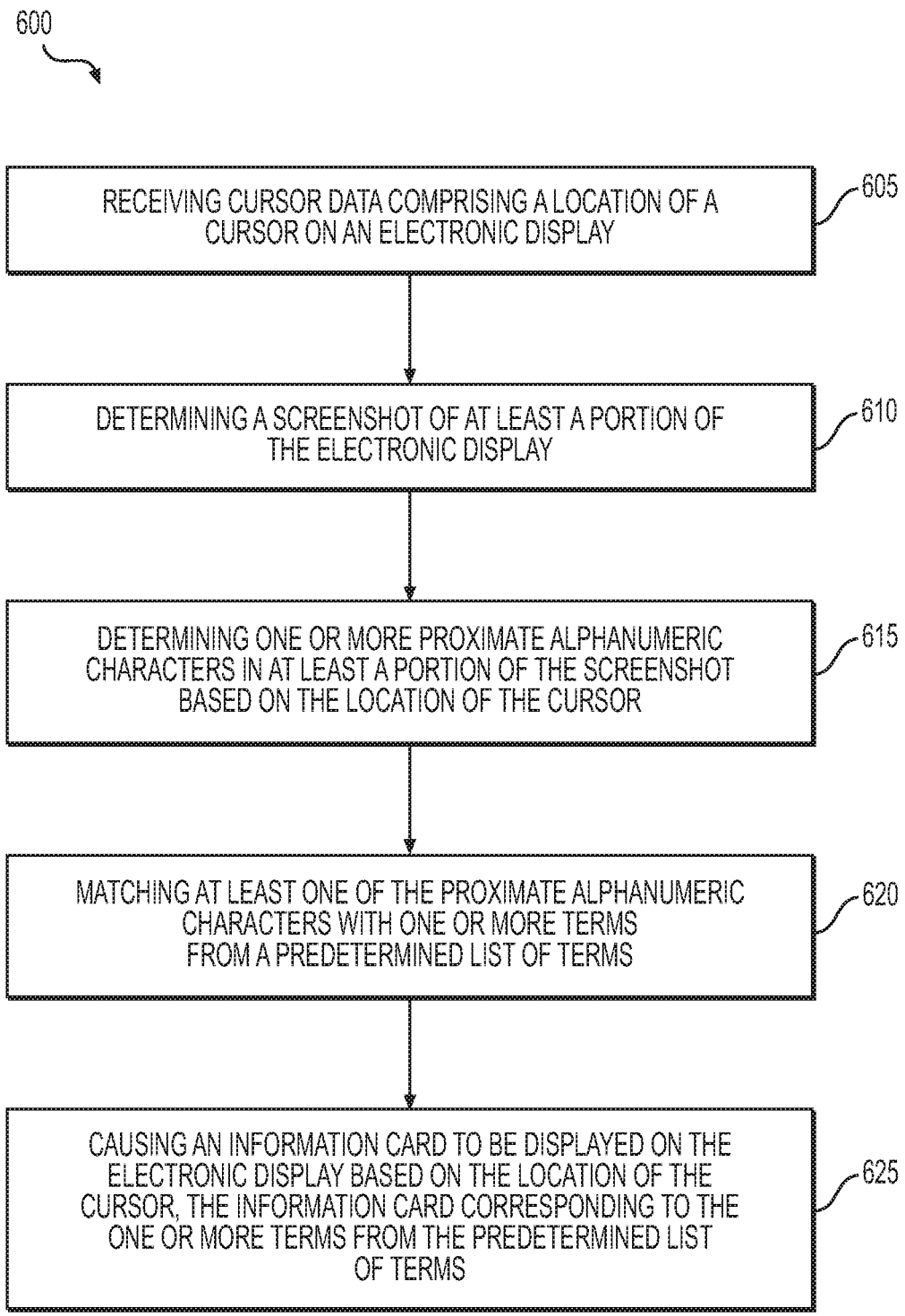
FIG. 6 is a flow chart of an example method of displaying contextually relevant information according to techniques presented herein.

FIG. 6 discloses a method 600 for displaying contextually relevant information, according to techniques discussed herein. At step 605, cursor data may be received comprising a location of a cursor on an electronic display, and, at step 610, a screenshot may be determined of at least a portion (e.g., subportion) of the electronic display. One or more proximate alphanumeric characters may be determined, at step 615, in at least a portion of the screenshot based on the location of the cursor, and at least one of the proximate alphanumeric characters may be matched, at step 620, with one or more terms from a predetermined list of terms. An information card may be caused to be displayed, at step 625, on the electronic display based on the location of the cursor, the information card corresponding to the one or more terms from the predetermined list of terms.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for displaying contextually relevant information, comprising:
    receiving cursor data comprising a location of a cursor on an electronic display;
    determining a screenshot of at least a portion of the electronic display;
    determining one or more proximate alphanumeric characters in at least a portion of the screenshot based on the location of the cursor;
    determining one or more contextual terms associated with at least one of the proximate alphanumeric characters, the one or more contextual terms being within a threshold proximity of the at least one of the proximate alphanumeric characters;

determining a semantic meaning of the at least one of the proximate alphanumeric characters based on at least one of the contextual terms, the semantic meaning based on a semantic classification;

matching the at least one of the proximate alphanumeric characters with one or more terms from a predetermined list of terms;

determining one or more indicators based on the matching the at least one of the proximate alphanumeric characters with one or more terms from a predetermined list of terms; and causing an information card to be displayed on the electronic display based on the location of the cursor, the information card corresponding to the one or more terms from the predetermined list of terms, the one or more indicators, and the semantic meaning.

2. The method of claim 1, wherein the screenshot comprises a subportion of the electronic display located within a predetermined radius of the cursor.

3. The method of claim 1, wherein a size of the screenshot comprises a predetermined subportion of the electronic display, the predetermined subportion of the electronic display being based on the location of the cursor.

4. The method of claim 1, further comprising:
upon determining that the one or more proximate alphanumeric characters in at least the portion of the screenshot are above a predetermined size threshold, determining a second screenshot of at least a portion of the electronic display, the second screenshot being larger than the screenshot.

5. The method of claim 1, wherein the screenshot is determined when a predetermined event is detected.

6. The method of claim 1, wherein the screenshot is determined when a predetermined event is detected, the predetermined event comprising a hover event of the cursor.

7. The method of claim 1, wherein determining a screenshot further comprises:
determining an active window, the active window comprising a currently focused application window on the electronic display, wherein the screenshot excludes any portion of the electronic display that is not the active window.

8. The method of claim 1, wherein determining one or more proximate alphanumeric characters in at least a portion of the screenshot comprises:
determining if a background of at least the portion of the screenshot is lighter than or darker than a predetermined threshold; and
in response to determining that the background of at least the portion of the screenshot is darker than the predetermined threshold, inverting colors of at least the portion of the screenshot.

9. The method of claim 1, further comprising:
determining a font size associated with the one or more proximate alphanumeric characters; and
in response to determining that the font size is below a predetermined threshold, scaling to enlarge the screenshot.

10. The method of claim 1, wherein the determining of the one or more proximate alphanumeric characters in at least the portion of the screenshot utilizes optical character recognition.

11. A system for displaying contextually relevant information comprising:
one or more processors; and
one or more machine-readable media storing software including instructions that, when executed by the one or more processors, cause the system to perform operations comprising:
receiving cursor data comprising a location of a cursor on an electronic display;
determining a screenshot of at least a portion of the electronic display;
determining one or more proximate alphanumeric characters in at least a portion of the screenshot based on the location of the cursor;
determining one or more contextual terms associated with at least one of the proximate alphanumeric characters, the one or more contextual terms being within a threshold proximity of the at least one of the proximate alphanumeric characters;
determining a semantic meaning of the at least one of the proximate alphanumeric characters based on at least one of the contextual terms, the semantic meaning based on a semantic classification;
matching the at least one of the proximate alphanumeric characters with one or more terms from a predetermined list of terms;
determining one or more indicators based on the matching the at least one of the proximate alphanumeric characters with one or more terms from a predetermined list of terms; and
causing an information card to be displayed on the electronic display based on the location of the cursor, the information card corresponding to the one or more terms from the predetermined list of terms, the one or more indicators, and the semantic meaning.

12. The system of claim 11, wherein the screenshot comprises a subportion of the electronic display located within a predetermined radius of the cursor.

13. The system of claim 11, wherein a size of the screenshot comprises a predetermined subportion of the electronic display, the predetermined subportion of the electronic display being based on the location of the cursor.

14. The system of claim 11, the operations further comprising:
upon determining that the one or more proximate alphanumeric characters in at least the portion of the screenshot are above a predetermined size threshold, determining a second screenshot of at least a portion of the electronic display, the second screenshot being larger than the screenshot.

15. The system of claim 11, wherein the screenshot is determined when a predetermined event is detected.

16. The system of claim 11, wherein the screenshot is determined when a predetermined event is detected, the predetermined event comprising a hover event of the cursor.

17. The system of claim 11, wherein determining a screenshot further comprises:
determining an active window, the active window comprising a currently focused application window on the electronic display, wherein the screenshot excludes any portion of the electronic display that is not the active window.

18. The system of claim 11, wherein determining one or more proximate alphanumeric characters in at least a portion of the screenshot comprises:
determining if a background of at least the portion of the screenshot is lighter than or darker than a predetermined threshold; and in response to determining that the background of at least the portion of the screenshot is darker than the predetermined threshold, inverting colors of at least the portion of the screenshot.

19. The system of claim 11, the operations further comprising:
   determining a font size associated with the one or more proximate alphanumeric characters; and
   in response to determining that the font size is below a predetermined threshold, scaling to enlarge the screenshot.

20. One or more non-transitory machine-readable media storing instructions that, when executed by one or more processors, cause performance of operations for displaying contextually relevant information comprising:
   receiving cursor data comprising a location of a cursor on an electronic display;
   determining a screenshot of at least a portion of the electronic display;
   determining one or more proximate alphanumeric characters in at least a portion of the screenshot based on the location of the cursor;
   determining one or more contextual terms associated with at least one of the proximate alphanumeric characters, the one or more contextual terms being within a threshold proximity of the at least one of the proximate alphanumeric characters;
   determining a semantic meaning of the at least one of the proximate alphanumeric characters based on at least one of the contextual terms, the semantic meaning based on a semantic classification;
   matching the at least one of the proximate alphanumeric characters with one or more terms from a predetermined list of terms;
   determining one or more indicators based on the matching the at least one of the proximate alphanumeric characters with one or more terms from a predetermined list of terms; and
   causing an information card to be displayed on the electronic display based on the location of the cursor, the information card corresponding to the one or more terms from the predetermined list of terms, the one or more indicators, and the semantic meaning.

* * * * *